United States Patent [19]

Willemsen

[11] 4,337,531
[45] Jun. 29, 1982

[54] SCANNING HEAD FOR AN OPTICAL DISC SYSTEM

[75] Inventor: Herman W. Willemsen, Nepean, Canada

[73] Assignee: Northern Telecom Limited, Montreal, Canada

[21] Appl. No.: 149,765

[22] Filed: May 14, 1980

[51] Int. Cl.³ .............................................. G11B 7/12
[52] U.S. Cl. ..................................... 369/45; 369/112
[58] Field of Search .................... 369/44, 45, 46, 110, 369/111, 112, 120, 121, 122; 250/241; 358/128.5, 128.6, 127

[56] References Cited

U.S. PATENT DOCUMENTS

| | | | |
|---|---|---|---|
| 3,530,258 | 9/1970 | Gregg et al. | 369/46 |
| 4,001,494 | 1/1977 | Adler et al. | 369/46 |
| 4,059,841 | 11/1977 | Bricot et al. | 369/45 |
| 4,092,529 | 5/1978 | Aihara et al. | 369/44 X |
| 4,135,083 | 1/1979 | Van Alem et al. | 250/201 |
| 4,135,206 | 1/1979 | Kleuters et al. | 369/44 X |
| 4,193,091 | 3/1980 | Kleuters et al. | 369/44 X |

Primary Examiner—Vincent P. Canney
Assistant Examiner—Donald McElheny, Jr.
Attorney, Agent, or Firm—Stuart L. Wilkinson

[57] ABSTRACT

In a scanning head for an optical disc system, a light beam from a laser is transmitted through a monomode optical fiber and then focussed on a record carrying surface of an optical disc by a converging lens. The end of the fiber can be reoriented within orthogonal planes perpendicular to the plane of the record carrying surface by transducers so as to correct for tracking and timing errors. The laser diode can function both as an emitter and, in an external cavity mode, as a detector of light reflected from the disc. Drive to the transducers is dependent on tracking and speed error signals generated from the detected light. For tracking and speed error compensation, only lens fiber end, and, optionally, a collimating lens, which are of negligible weight, need be moved rather than the entire scanning head. This provides a simple structure having a high frequency response and low power consumption.

11 Claims, 4 Drawing Figures

SCANNING HEAD FOR AN OPTICAL DISC SYSTEM

BACKGROUND OF THE INVENTION

This invention relates to an optical scanning head for retrieving information stored on an optical carrier.

A variety of optical carriers are known, but the most well known is that introduced by Phillips which is a disc rotatable about a central axis. Analogous in some respects to the familiar audio disc, information is stored on the disc as pits of approximately 1 micron diameter along a spiral track of pitch approximately 2 microns. The disc is interrogated by a beam of coherent light derived from a laser and focussed to a spot of about 2 microns at the disc. A reflected beam is monitored and from this is derived information that has been recorded—the data signal.

The scanning head of the present invention is particularly adapted for use with such a disc carrier but the particular novel feature of the scanning head suits it also for use with other carriers which have been proposed such as discs having concentric tracks, selectively optically transmissive carriers, drum carriers, pre-grooved carriers, etc.

The invention relates particularly to scanning heads for use in mass memory systems having a data rate up to 10 Mbit per second and fast random access (100 ms) to any part of the track. In such systems, the effect of resonance of individual components of the scanning head produced by rapid access is minimized. Since there is no mechanical contact between the optical scanning head and the optical disc as there is in the case of the familiar audio disc, the optomechanical design, in addition to generating the data signal, must also produce a servo signal to correct for focussing error, a servo signal to correct for tracking error, and a servo signal to correct for timing error in rotational speed of the disc.

In a known optomechanical device for error correction in the position of an interrogating light spot, a laser beam is split into three components using a diffraction grating. The three components are then reflected from two voice coil-driven mirrors and are focussed on the disc. With the aid of a Wollaston prism, the reflected beams impinge on a quadrant detector from which recorded information and focus error signals are generated, and on two additional detectors for generating tracking error signals. Error signals are then fed to closed loop servo electronics which drive voice coil motors on the mirrors and objective lens.

SUMMARY OF THE INVENTION

Other systems use a "dither" of the main beam in conjunction with phase sensitive detection to generate tracking errors. Another deflected part of the main beam is used in conjunction with a split photodiode to provide focus error signals. This has been realized in a read head developed by U.S. Phillips Corporation (U.S. Pat. No. 4,135,206).

The present invention provides an optomechanical design which is realized as a small lightweight, rugged, low cost, prealigned cartridge-type read head which uses a minimum number of components. It is specifically designed for, and its main advantages are, that it is amenable to fast random access and that it needs no specialized installation and maintenance. The scanning head makes use of a diode injection laser coupled to an optical fiber. The fiber serves two important functions:

(i) The output of the fibers is an istropic beam so there is no requirement for a special cylindral lens at the diode for beam shaping. Diodes in addition do not need to be single mode since the fiber itself can be made monomode.

(ii) When coupled to two mutually orthogonal bimorphs in order to move the optical path the requisite distances for track selection, track following and speed compensation, only a negligible weight fiber has to be moved in contrast with the entire scanning head. This improves frequency response and consumes less power in addition to being simple to build.

Preferably the diode laser serves not only to generate the scanning beam, but also to detect the tracking signal and the recorded information. The detection method relies on optical feedback modulating the input electrical power to the laser.

A focus control is preferably provided by means of another light beam which is directed by a second optical fiber to the disc and which is derived either from the back of the laser or from the main fiber by means of a coupler. Its optical path is parallel to the primary beam and, when focussed at and reflected from the disc, the beam falls in the center of a split photodiode symmetrically placed relative to the fiber. Motion of the disc relative to the focal plane favours one diode over the other.

BRIEF DESCRIPTION OF THE DRAWINGS

An embodiment of the invention is described by way of example with reference to the accompanying drawings, in which.

DETAILED DESCRIPTION OF THE DRAWINGS

Figure 1:
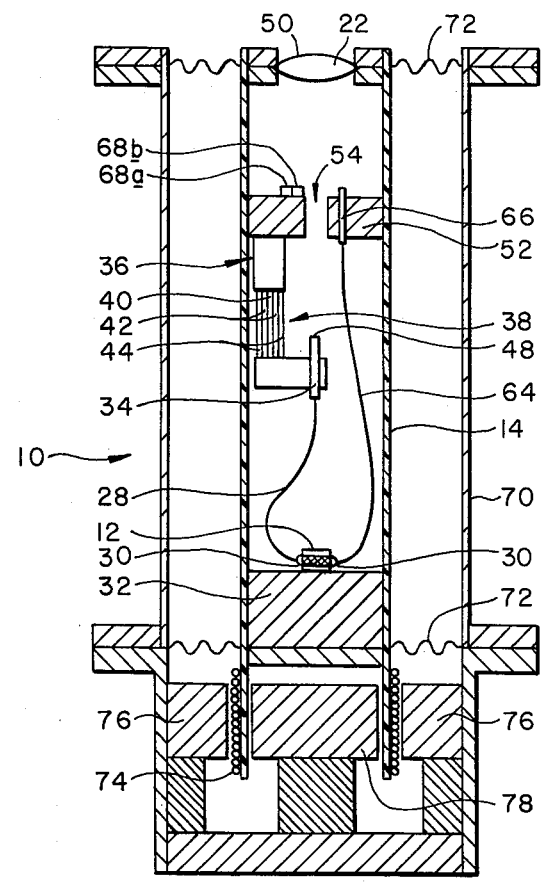
FIG. 1 is a non-scalar, longitudinal sectional view of an optical scanning head according to the invention.

Referring to the drawings in detail, FIG. 1 shows an optical scanning head 10 incorporating a GaAlAs laser 12 mounted within a tubular frame 14 of non-magnetizable material such as plastics or aluminum. The laser is of the double heterostructure type having a wavelength of 820 nm. An output from the laser is directed to the underside of a video disc 16 (FIG. 2) which bears information in the form of regions of varying reflectivity extending along a spiral track. The disc 16 is centrally supported on a turntable 17 which rotates about a dynamically-balanced high-precision bearing 19 having low radial runout.

Figure 2:
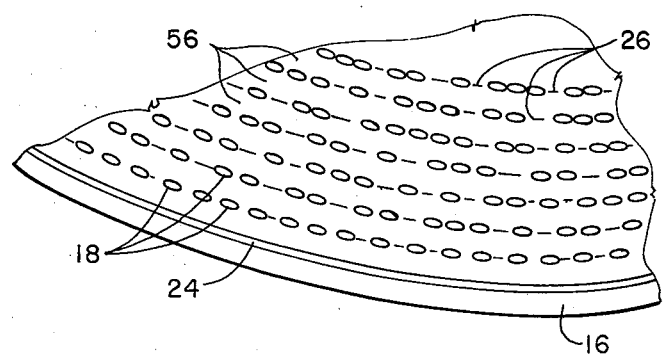
FIG. 2 is a perspective, non-scalar view of a video disc for use with the scanning head of FIG. 1.

As shown in FIG. 2, regions of low reflectivity are formed as successive pits 18 of diameter 1 micron and depth 0.2 microns or approximately λ/4 where λ is the laser wavelength. The geometry of the pits 18 gives rise to light absorption, scattering or deflection which is different from that of the surrounding lands. Less light is emitted from the pits since deflection occurs and deflected rays fall outside the limiting aperture of a converging lens 22 through which the reflected beam is transmitted. The disc 16 has a metallized coating 24, to increase reflectivity. The series of discrete absorbing, scattering or deflecting areas extending along a spiral track 26 provides either an analog or digitally encoded carrier which can be converted to a video or data output. The digital carrier is adpated for mass memory systems and requires initial decoding whereas the analog carrier permits regeneration of a video signal after appropriate demodulation. A description of some types of video may be found in Applied Optics, Vol. 17, pages 1993-2042 (1978). The discs themselves which may vary in design, for example, including those which may be interrogated at absorbing, scattering or deflection centres arranged on spiral or concentric tracks, form no part of the present invention. The disc carrier is read by focussing a beam of light from the laser 12 at the disc surface. The scanning head monitors light reflected from the disc and analyzes the changing pattern of reflectivity as the disc rotates.

As indicated previously, the information on the disc 16 may require decoding or demodulating equipment, (for example, PSK or PAM-FM demodulation) in order to generate an electrical signal from the detected optical pattern. Particularly for mass memory purposes, the scanning head must be inwardly accelerated extremely rapidly from a rest position radially outward of the disc circumference, and must be braked quickly with minimum ensuing oscillation. Subsequently the optical scanning beam must be focussed at, and accurately follow, the spiral track 26. For proper tracking, the scanning head 10 must incorporate the capacity for: (i) changing the focus position in a direction perpendicular to the plane of the disc to maintain the beam focussed at the recording surface; (ii) changing the focus position in a radial direction to maintain the beam centrally of the spiral track and (iii) changing the focal position in a tangential direction parallel to the track, to compensate for fluctuations in disc rotational speed, the latter being a requirement for video systems.

Radial or tracking position signals are required to compensate both for eccentricity in the disc mounting and for head velocity control as the scanning head 10 cannons radially in and out for track selection during random access to data on the disc 16. The optical scanning spot must be centered to within 0.2 microns of the track center to avoid crosstalk. Radial adjustment is achieved using a monomode optical fiber 28, one end of which is secured by index matching epoxy 30 to an output facet of the laser 12, the laser being mounted on a heat sink 32 fixed within the tubular frame 14. The other end of the optical fiber 28 is secured by an index matching epoxy to one end of a Selfoc ® lens 34 of pitch $n\lambda/4$ where $\lambda$ is the emitted wavelength of the laser and n is an odd integer. The Selfoc lens 34 thus collimates light launched into it from the fiber 28. The monomode collimated light is directed through the objective converging lens 22 towards the disc 16. The converging lens can comprise a lens system of spherical optics corrected for important aberrations. Both the Selfoc lens 34 and the converging lens 22 have an antireflective coating, 48 and 50 respectively, on their upper surfaces.

The Selfoc lens 34 is mounted from two piezoelectric bimorphs, 36 and 38 which are cemented together in orthogonal disposition. The bimorph 36 is adapted to move the focussed spot from the scanning beam in a tangential direction relative to the disc and the other bimorph 38 is adapted to move the focussed spot in a radial direction relative to the disc.

Each bimorph is a sandwich structure comprising a 0.1 mm. central conducting layer 40 of BeCu, flanked by 1 mm. piezoelectric ceramic layers 42 and 0.1 mm. Ag surface layers 44. The two piezoelectric layers 42 of each bimorph are oppositely poled such that when a voltage of one polarity is applied, the material of one of the piezoelectric layers contracts in the plane of the layer while the material of the other piezoelectric layer expands in the plane of the layer. Consequently the sandwich structure bends out of planarity. For a reverse voltage, the bimorph bends in the opposite direction. The deflection of one end relative to the other is voltage dependent. An upper end of the upper bimorph 36 is cemented to an annular disc 52 mounted within the tubular frame 14 so as to provide a fixed reference point, and the Selfoc lens 34 is mounted on the lower end of lower bimorph 38. The collimated beam from the lens 34 can thus be angularly deflected in orthogonal directions. According to the magnitude of deflection, the beam focussed by the lens may be moved tangentially or radially relative the disc record surface. Typically for a $\frac{3}{4}''$ long bimorph, a deflection of 10 microns is achieved by a deflecting voltage of 80 volts.

The disc 52 has a central aperture 54 to permit passage of scanning and reflected light.

In operation, light emitted from the lens 34 is focussed at the disc record surface and is reflected back along the optical path towards the laser 12. The reflected light then couples back into the laser so as to alter the level of lasing activity to an extent dependent upon the power level of the incoming light. In effect, the laser lens and disc combination functions as an external cavity device. The reflected light carries data and tracking information. Data is extracted and decoded or demodulated to generate a data signal or a video output on a CRT or the like.

Figure 3:
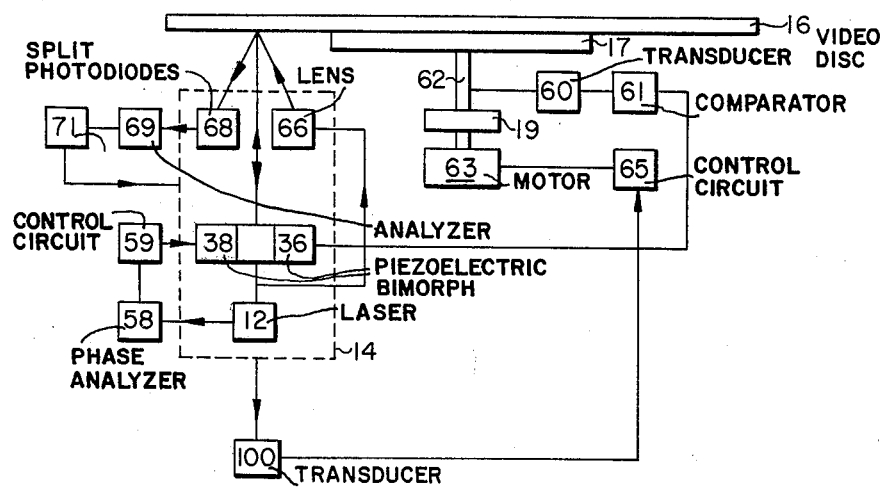
FIG. 3 shows a block schematic diagram of a control circuit for the optical scanning head of FIG. 1.

The tracking information is used to alter the focus position in the plane of the disc in order to maximize the video signal input information from the disc. Specifically to detect error in tracking, a 60 KHz signal is impressed on the tracking bimorph 38 to obtain a low frequency oscillation of the scanning beam about the spiral track. Laterally bounding the track 26 are relatively high reflectivity annular lands 56. As the focussed spot, which is of the order of 1 $\mu$m in diameter, oscillates about a track, a reflection component is generated having a 30 KHz frequency and a phase position dependent upon whether the focus position prevails on one side of the track or on the other. As shown in FIG. 3, the 30 KHz signal is analyzed at a phase analyzer 58. The analyzer output is fed to a control circuit 59 at which a servo signal is generated for application to the tracking bimorph 38. The 60 KHz wobble permits the tracking error compensation to be applied sufficiently rapidly to neutralize disc runout and vibrations typically in the frequency range of 300 Hz which is set up during operation and when the optical scanning head 10 is braked rapidly when used in a random access mode. For video output, to keep disc speed fluctuation down to 1 part in 1000, a transducer 60 is mounted adjacent a rotating shaft 62 from which drive to the disc is taken. The transducer 60 monitors the speed of the shaft and delivers an output to a comparator 61. Accordingly as the transducer output is more or less than a predetermined output, the comparator 61 delivers an error signal to the bimorph 36 momentarily to advance or retard the spot position relative the spiral track. In addition a servo signal is applied via control circuit 65 to a motor 63 driving turntable 17 to correct the disc rotational speed.

In addition, for video output, it is important to maintain a constant data rate from the complete radial extent of the record carrier. For constant rotational frequency of these discs, this varies linearly with radial position of the focussed spot. Transducer 100 generates a coarse radial position signal which, when fed to control circuit 65, changes the rotational frequency of stepping motor 63 in such a way as to maintain constant data rate in conjunction with the fine control possible with bimorph 36.

As indicated previously, the interrograting beam from the laser 12 must be focussed at an imaginary plane instantaneously coincident with a target location on the video disc record surface. Focussing adjustment capability is required since a vertical runout better than 100 microns is not usually obtainable for the disc regardless of the bearing system adopted. In addition, at high operational speeds, of the order of 25 to 30 r/s per second, some dynamic flattening of the disc record surface occurs. The converging lens 22 has a very short depth of focus, of the order of 2 microns, so constant repositioning of the scanning head relative the disc is required to keep the scanning head 10 focussed onto the disc surface.

As shown in FIG. 1, focussing error is detected by launching light from a reverse facet of the laser 12 into a second optical fiber 64, the other end of which is attached to a Selfoc ® collimating lens 66 secured within the disc 52. The lens 66 directs a collimated beam of light parallel to, but displaced from, the optic axis of the converging lens 22. The beam is focussed at the disc 16, the beam being reflected back towards split photodiodes 68 located adjacent one another on a radius of the disc 52. When the spacing of the video disc 16 and the converging lens 22 is such that the scanning spot is accurately focussed on the disc 16, the light incident on one photodiode is the same as that incident on the other. As the spacing increases, the radially outer photodiode 68a receives a higher proportion of the reflected light, while if the lens-disc spacing decreases, the inner potodiode 68b receives the higher proportion of reflected light. The difference in light incident on the two photodiodes 68 is monitored at an analyzer 69 and a servo signal representative of that difference is generated at a control circuit 71. The servo signal is used to reciprocate the tubular frame 14 within an outer fixed cylindrical member 70 within which it is fixed by clamped membranes 72.

Focussing adjustment is achieved as follows. An angular focussing coil 74 is mounted at the lower end of the tubular frame 14. The coil 74 is located in a gap between a soft iron annulus 76 and soft iron core 78 forming parts of an axially magnetized permanent magnetic stator. On applying an electric current to the focussing coil 74, an electromagnetic Lorenz force is exerted on the focussing coil and thus on the tubular frame 14 which can be reciprocated along the optical axis of the lens 22. The focussing mechanism, although an essential feature of the optical scanning head 10, is not a material part of the invention. In an alternative embodiment, (not shown), focussing is preserved by monitoring the capacitance between the metallized surface of the disc 16 and an electrode bonded to the converging lens 22.

It will be appreciated that neither the converging lens 22 not the laser 12 need be tilted in order to apply the required error correcting tracking and the disc speed movements to the focussed spot. Instead, the collimated beam emitted from the Selfoc lens 34 is reoriented by virtue of using a flexible optical fiber. In this way the number of components moved to restore the focus spot position is minimized.

Figure 4:
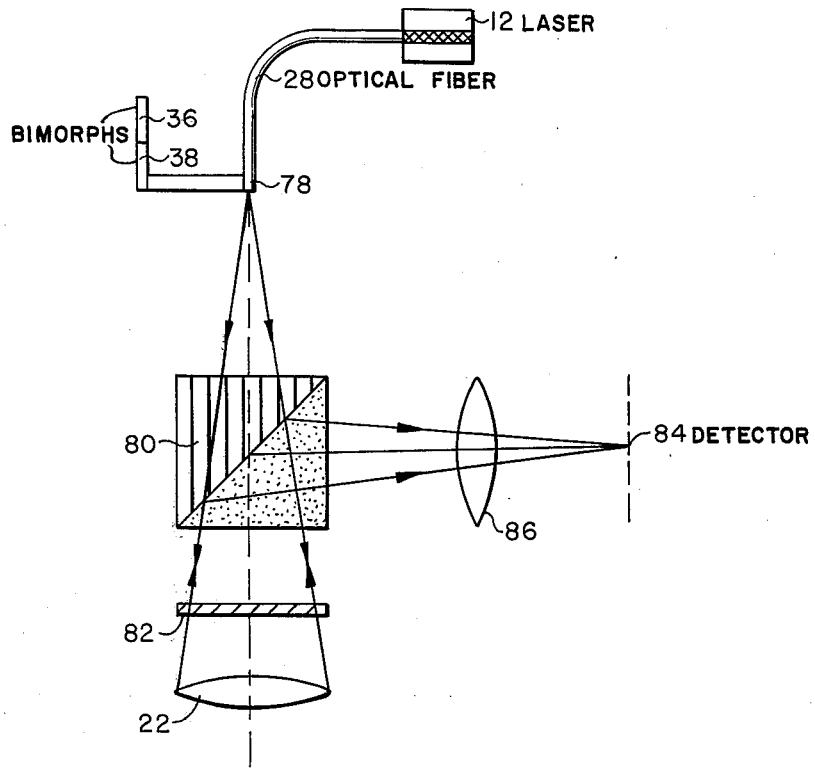
FIG. 4 is a schematic view of an alternative optical scanning head according to the invention.

In an alternative embodiment illustrated schematically in FIG. 4, a fiber 28 receives light from a laser 12. An end 78 of the fiber remote from the laser 12 is itself fixed to the crossed piezoelectric bimorphs 36, 38. Light from the fiber end 78 diverges towards a polarizing beam splitter 80 which is orientated such that a majority of the incident light is passed to a quarter wave plate 82 and an objective lens 22 which focusses the light at the record carrying surface of an optical disc (not shown). Reflected light has its plane of polarization rotated by the quarter wave plate 82 so that at the polarizing beam splitter 80, a majority of the reflected light is reflected towards a quadrant detector 84. A cylindrical lens 86 imparts an astigmatism to an image formed on the detector 84. If the reflected light does not emanate from the focal point of the objective lens 22, then an opposed pair of the detectors of quadrant detector 84 show a greater light incidence than the other opposed pair, the particular pair depending on whether the converging light originates from above or below the objective lens focal point. An appropriate focussing correction can be made as described previously with respect to FIG. 3. The data signal can be extracted either at the laser 12, by utilizing the self coupling phenomenon discussed previously, or from the quadrant photodetector 84, the splitting factor of the polarizing beam splitter 80 being set accordingly.

What is claimed is:

1. An optical scanning device for scanning an optical record at a reflecting surface of an optical storage disc, the optical scanning device comprising:
   a support frame;
   an optical source fixedly mounted relative to the frame;
   a single length of optical fiber having one end disposed to receive light from the source, such light being emitted from the other end of the optical fiber;
   an objective lens for focussing the emitted light at a focus position on the surface of the optical disc;
   monitoring means for monitoring light reflected from the surface of the optical disc;
   guide means responsive to an output from said monitor means to alter the position of the other end of the fiber relative to said objective lens whereby to alter the focus position within the plane of the surface of the disc.

2. An optical scanning device as claimed in claim 1, in which said guide means includes a pair of electrical transducers, one transducer operable to angularly reorientate the other end of the fiber, and a beam of light emitted therefrom, in a first plane perpendicular to the plane of the disc, and the other transducer operable to angularly reorientate the other end of the fiber and the beam of light emitted therefrom in a second plane perpendicular to the plane of the disc and angularly inclined to said first plane.

3. An optical scanning device as claimed in claim 2 in which a collimating lens is mounted at the other end of the fiber and the electrical transducers are attached to and reorientate the collimating lens whereby to reorientate the other end of the fiber.

4. An optical scanning device as claimed in claim 1 in which the optical fiber is monomode fiber.

5. An optical scanning device as claimed in claim 2, in which said electrical transducers are piezoelectric bimorphs.

6. An optical scanning device as claimed in claim 1, in which said optical source is a semiconductor laser.

7. An optical scanning device as claimed in claim 6, in which, in operation, said laser functions both as the optical source and said monitor means, light reflected from said optical disc self coupling back into the laser whereby to change a level of lasing activity in the laser, said device further including detection means for detecting said change in lasing activity level.

8. An optical scanning device as claimed in claim 7 further comprising a first control means responsive to an output from the detection means to drive said guide means.

9. An optical scanning device as claimed in claim 8 further comprising a second control means responsive to an output from the detection means to generate a data or video signal.

10. An optical scanning device as claimed in claim 1, in which the objective lens is mounted within said frame, said scanning device further comprising means for reciprocating the frame towards and away from the disc.

11. An optical scanning device as claimed in claim 3, in which said collimating lens is of cylindrical form and has a refractive index increasing radially outwardly, said lens being of pitch length $n\lambda/4$ where n is an odd integer and $\lambda$ is the peak output wavelength of the source.

* * * * *